United States Patent
Stanton

(10) Patent No.: US 6,262,942 B1
(45) Date of Patent: *Jul. 17, 2001

(54) TURBULENCE-RESOLVING COHERENT ACOUSTIC SEDIMENT FLUX PROBE DEVICE AND METHOD FOR USING

(75) Inventor: Timothy Peter Stanton, Carmel Valley, CA (US)

(73) Assignee: The United States of America as represented by the Secretary of the Navy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,251

(22) Filed: Mar. 26, 1999

(51) Int. Cl.[7] ................................................. G01S 15/50
(52) U.S. Cl. ................................................. 367/90
(58) Field of Search ........................ 367/89, 90, 91, 367/15; 73/170.32

(56) References Cited

U.S. PATENT DOCUMENTS

| | | | |
|---|---|---|---|
| 4,138,657 | 2/1979 | Shave | 367/91 |
| 4,751,847 | 6/1988 | Katakura et al. | 73/629 |
| 4,872,146 | 10/1989 | Farmer et al. | 367/87 |
| 5,315,562 | 5/1994 | Bradley et al. | 367/89 |
| 5,422,860 | 6/1995 | Bradley et al. | 367/89 |
| 5,615,173 | 3/1997 | Brumley et al. | 367/90 |

OTHER PUBLICATIONS

T. P. Stanton, "Coherent Acoustic Sediment Flux Probe," U.S. Army Corps of Engineers, Contract Report CERC–96–Sep. 1, 1996.

T. P. Stanton, "Probing Ocean Wave Boundary Layers with a Hybrid Bistatic/Monostatic Coherent Acoustic Doppler Profiler," Abstract describing in general terms the capabilities, but not the operation of the BCDV, presented at a conference in Oct. 1996.

*Primary Examiner*—Daniel T. Pihulic
(74) *Attorney, Agent, or Firm*—Donald E. Lincoln

(57) ABSTRACT

This invention describes a new method to estimate the sediment flux in front of a Coherent Acoustic Sediment Probe (CASP) instrument. Also, described is a newly invented Bistatic Doppler Velocity and Sediment Profiler (BDVSP) device for measuring sediment concentration, sediment velocity, and the resultant sediment transport in a sediment bed, and for the measurement of turbulent stresses and dissipation in the ocean.

2 Claims, 7 Drawing Sheets

TURBULENCE-RESOLVING COHERENT ACOUSTIC SEDIMENT FLUX PROBE DEVICE AND METHOD FOR USING

BACKGROUND OF THE INVENTION

1. Field of the Invention

This invention relates to the measurement of sediment concentration, sediment velocity, and the resulting sediment transport, and to the measurement of turbulent stresses and dissipation in the ocean, particularly in estuaries and the nearshore coastal boundary where sediment transport affects a wide range of human activity. More precisely this invention relates to field measurements of sediment transport in rivers, the near-shore coastal region, and coastal shelf regions, and to the concurrent measurement of turbulent processes which control sediment transport. Specifically the devices operate by noninvasively measuring both suspended sediment concentration and three component velocity vectors in the same, small volume, allowing their product, the three component sediment mass flux, to be directly estimated in the water column above the sediment bed, while resolving turbulent velocity scales. Furthermore, selection of the transmitted frequency allows the acoustic backscatter response to be matched to the size distribution of sandy sediments while rejecting scattering from fine muds which typically compromise optical backscatter estimates of sand transport.

2. Description of the Related Art

Previous sediment flux measurements have used optical backscatter sensors (for example, Huntley, D. A. and D. M. Hanes, 1987, "Direct Measurement of suspended sediment transport", Coastal sediments, 87. pp 723–737), profiling acoustic backscatter devices, (for example Hanes, D. M., C. E. Vincent, D. A. Huntley and T. L. Clarke, 1988, "Acoustic measurements of suspended sand concentration in the $C^2S^2$ experiment at Stanhope Lane, Price Edward Island", Marine Geology, 81, pp 185–196), or pumped sampling systems (Thornton, E. B., and W. D. Morris, 1977, "Suspended sediments measured within the surf zone", Coastal Sediments 87, pp 655–668), to estimate the mass concentration at some level above the sediment bed. An in situ current meter (usually which measures only 2 of the 3 velocity components, and perturbs the flow being measured) is located near the mass sampling point. Mass flux, at scales much larger than the separation of the mass and current measurement locations (typically 10 to 50 cm), is estimated as the product of the mass concentration and the nearby measured velocity components. This large scale inherent in these separated mass and velocity measurements prevents sediment flux measurement at small scales found within or near the oscillatory, wave forced, boundary layer above the sediment bed, where much of the sediment transport occurs on coastal beaches. Studies using a Laser Doppler Velocimeter (Agrawal, Y., J. H. Trowbridge, H. C. Pottsmith and J. Oltman-Shay, "Velocity, concentration and flux of sediments in a coastal bottom boundary layer with a laser doppler velocimeter", Oceans 93, Proc. IEEE Conf. Ocean Engrg., Victoria, B.C., Canada) have improved these methods by measuring two components of velocity and relative sediment concentration at a single point.

Acoustic doppler measurements of fluid flow using doppler acoustic techniques are described in a range of patents using incoherent doppler sampling (for example David G. Shave, "Shipboard Apparatus for Measuring Ocean Currents," U.S. Pat. No. 4,138,657 (Feb. 6, 1979), and Blair H. Brumley, et al., "Broadband Acoustic Doppler Current Profiler," U.S. Pat. No. 5,615,173 (Mar. 25, 1997)). The pulsed coherent acoustic doppler method used in the present invention is discussed in Katakura, (Kageyoshi Katakura, et al., "Ultrasonic Velocity Meter," U.S. Pat. No. 4,751,847 (Jun. 21, 1988)), which describes the method of estimating a doppler velocity from a coherently sampled, complex demodulated acoustic signals. Similar signal sampling and signal processing techniques for pulsed coherent systems are widely published in the atmospheric radar literature, and are summarized in Doviak, J. and D. S. Zrnic, 1984, "Doppler Radar and Weather Observations", Academic Press. A patent issued to David M. Farmer and R. Del Hudson, "Method and Apparatus for Simulating Phase Coherent Signal Reflections in Media Containing Randomly Distributed Targets," (U.S. Pat. No. 4,872,146 (Oct. 3, 1989)) discuss more broadly the theory of coherently sampling sparse, weak scatterers in a fluid to estimate the population count of discrete scatterers such as fish. The current invention broadly uses the underlying principles of coherent sampling to estimate backscatter strength, but is not concerned with finding the population count of discrete scatterers, but rather finding a concentration of scatterers with a broader, typically lognormal size distribution. This invention also describes an in situ calibration method which overcomes several limitations of acoustic models of ultrasonic backscatter from sandy sediments (see for example Sheng, J., and A. E. Hay, 1988, "An examination of the spherical scatterer approximation in aqueous suspensions of sand," J. Acoust. Soc. Am., 83, 598–610).

SUMMARY OF THE INVENTION

The object of the Coherent Acoustic Sediment Probe (CASP) method is to overcome limitations of existing sediment flux measurement techniques by non invasively measuring both (i) the three component velocity vector and (ii) the sediment mass concentration in the same 1 $cm^3$ sample volume, at a distance 25 cm in front of the instrument head, while concurrently measuring vertical profiles of sediment concentration above the sediment bed. The CASP uses a rapidly sequenced combination of monostatic (the same transducer transmits and receives) and bistatic mode (one transducer transmits while two others receive) ultra sonic transceivers, and pulsed coherent sampling techniques to reach these objectives. FIG. 1 shows a cross section through the transducer head, with a single 1.4 MHZ, 2.5° beamwidth acoustic transducer in the center of the head, and one of three 5.2 MHZ transducers directed to an intersection point 25 cm in front of the instrument head. The bistatic mode estimates three component velocity vectors at this intersection sample volume, which is defined by the acoustic pulse length and the transducer beam-widths. Monostatic operation profiles acoustic backscatter strength, which is processed using an scattering/attenuation-corrected model to infer sediment mass concentration profiles. Pulsed acoustics, phase coherent sampling, and wide dynamic range, linear signal processing methods are used in the instrument to provide very high temporal and spatial resolution measurements of the doppler-shifted frequency and acoustic energy backscattered from sediments in the water column.

A derived measurement technique suited for more detailed, lower wave forcing observation conditions has also been implemented for the newly invented Bistatic Doppler Velocity and Sediment Profiler (BDVSP) instrument. This system uses a single pulsed transmitter to ensonify an O(1 $cm^3$) sample volume down through the water column, as shown in FIG. 7. Three fan beam-response bistatic receiver transducers detect backscattered acoustic energy from range-gated bins through the water column, while the central transmitting transducer also monostatically receives range-gated acoustic energy from the same time-separated ensonified volumes. Both sediment concentration and along-beam velocity are measured from the central beam receiver, while profiles of three-component velocities are calculated from doppler shifts received by each of the surrounding bistatic receivers. Under more restricted environmental conditions, the BDVSP allows profiling of sediment concentration AND three component velocities to be measured above the bed, in comparison with the single velocity vector measurement made by the CASP. This additional velocity profile information has great advantages in studying the hydrodynamics of sedimentation processes and the study of other fluid boundary flows in the field.

BRIEF DESCRIPTION OF THE DRAWINGS

FIG. 4 is a schematic of the acoustic and sediment concentration calibration system, wherein:

1 COHERENT ACOUSTIC SEDIMENT PROBE (CASP)
2 ACOUSTICALLY TRANSPARENT MEMBRANE
3 DUCTED PROPELLER
4 ACRYLIC VESSEL WITH ROUNDED BOTTOM THEREIN
5 VARIABLE SPEED MOTOR
6 OPTICAL BACK SCATTER SENSOR
7 ACRYLIC LABORATORY ACOUSTIC TEST TANK
8 SUSPENDED SEDIMENT

Figure 5:
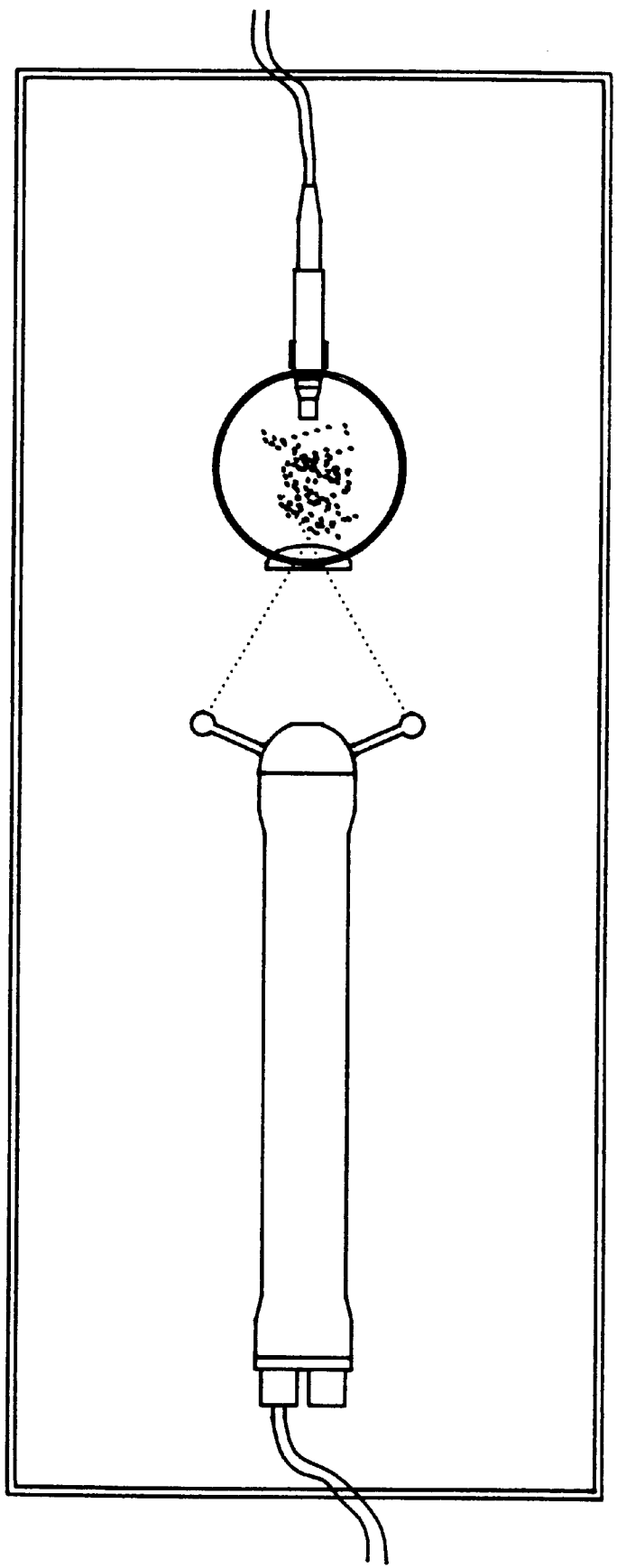

FIG. 5 is a photograph of the acoustic/sediment concentration facility.

Figure 6:
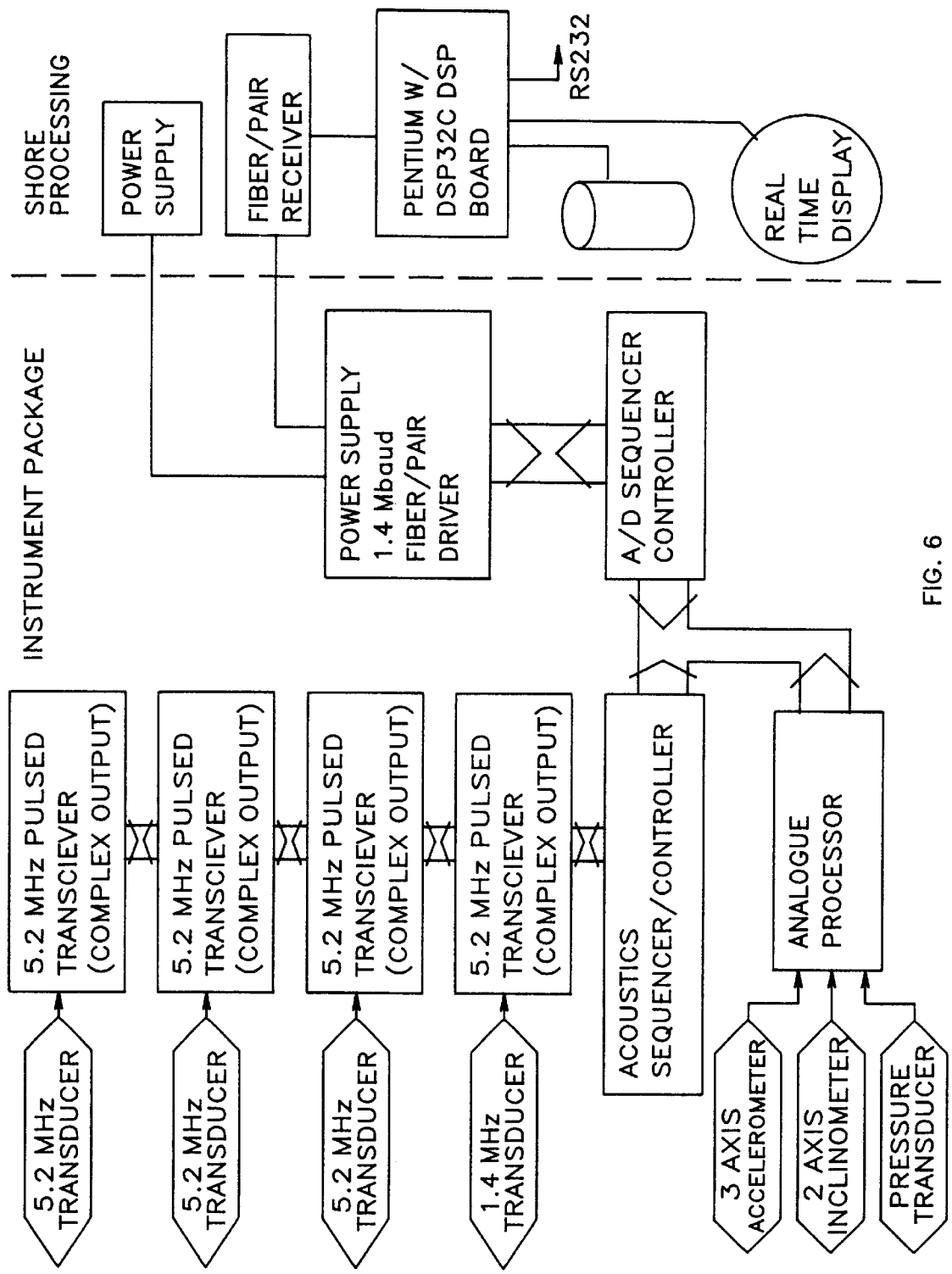

FIG. 6 is a block diagram of the CASP probe electronics modules.

Figure 7:
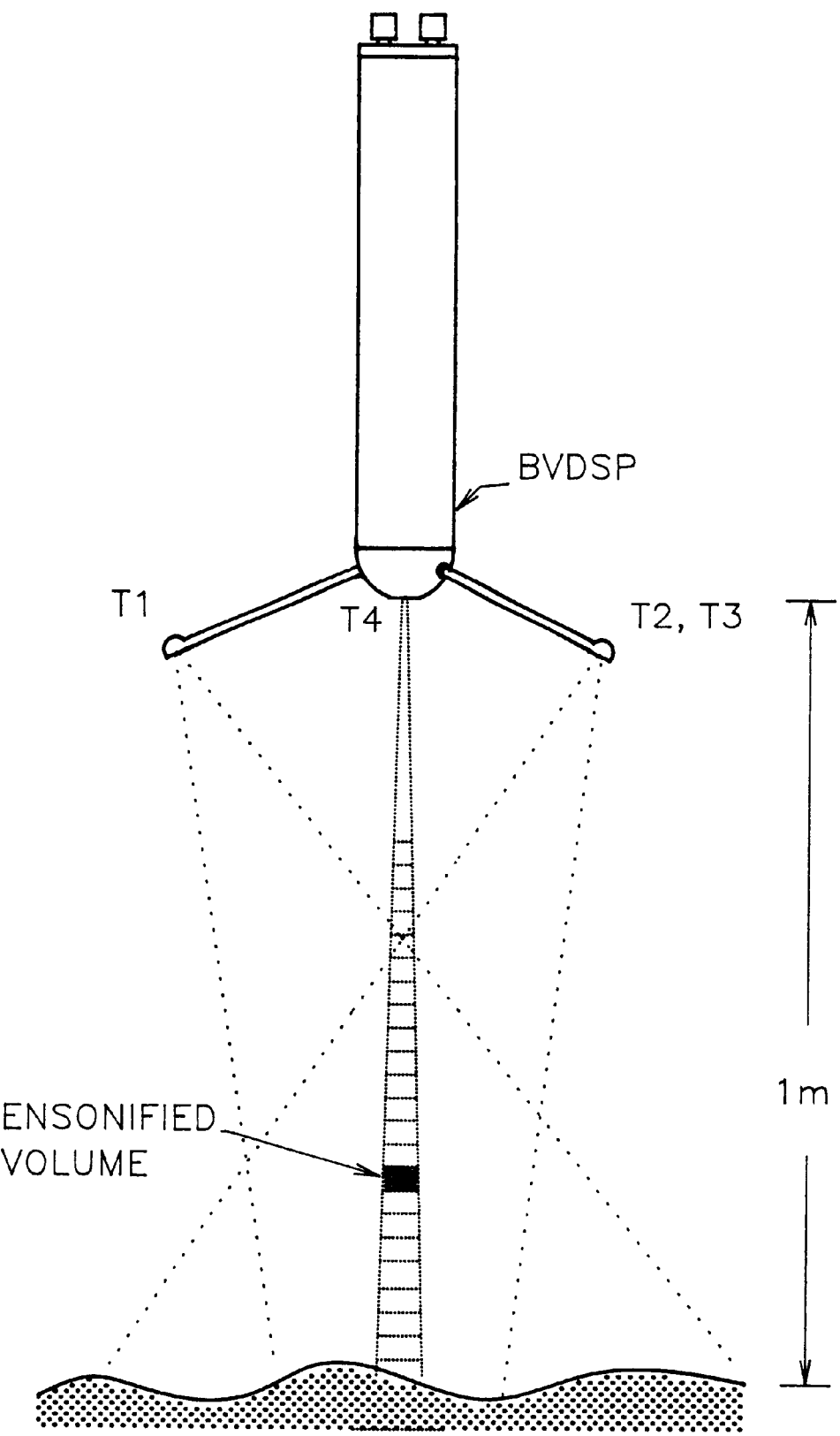

FIG. 7 is a schematic of the BDVSP bistatic operation. Multiple range bins are shown as the repeated acoustic pulse travels down toward the bed from the central transmitting transducer.

DESCRIPTION OF THE INVENTION

1. Bistatic Doppler Velocity Estimation In The CASP

Figure 1:
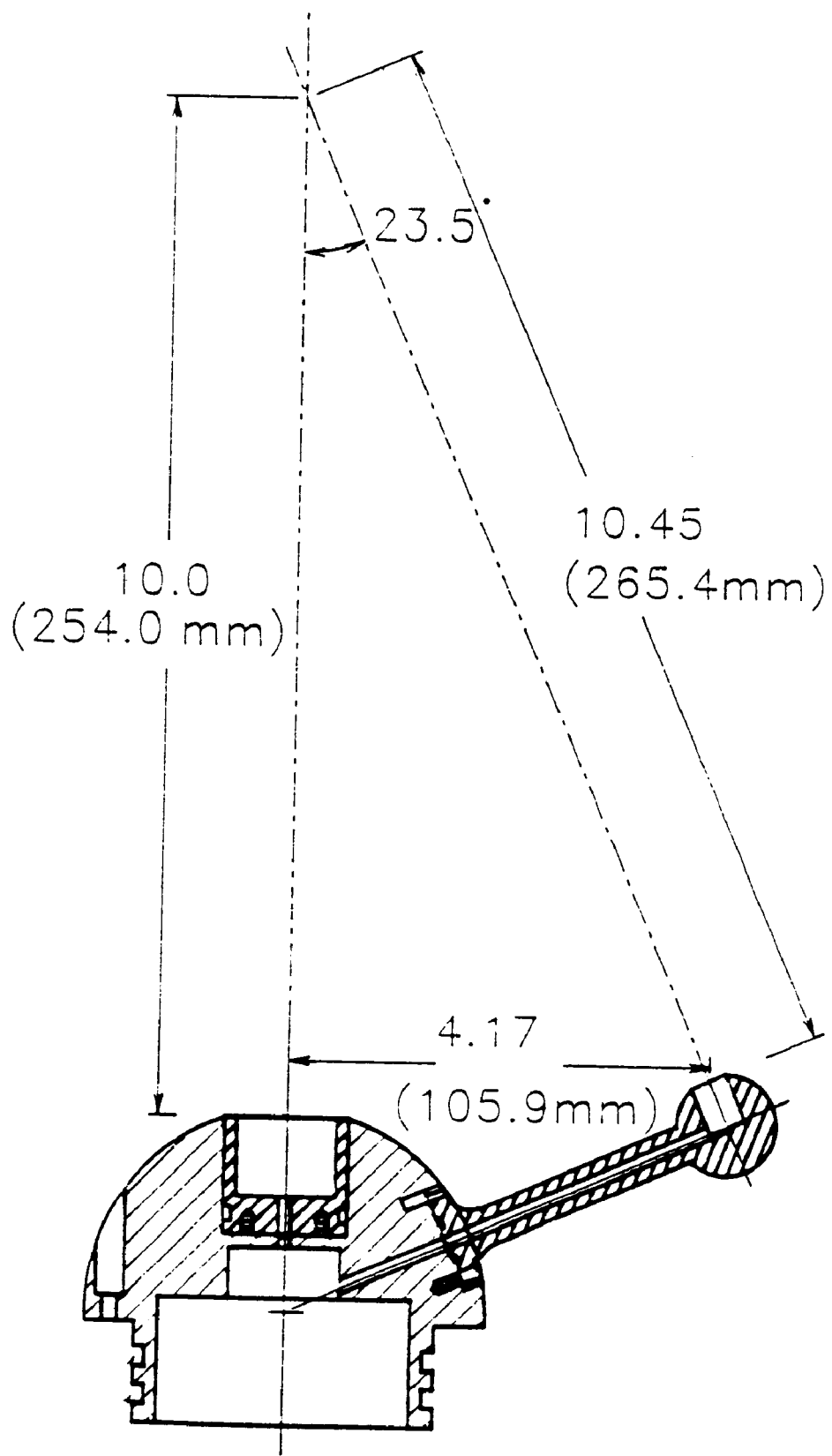
FIG. 1 is a cross-section schematic of the CASP transducer head.
Figure 2:
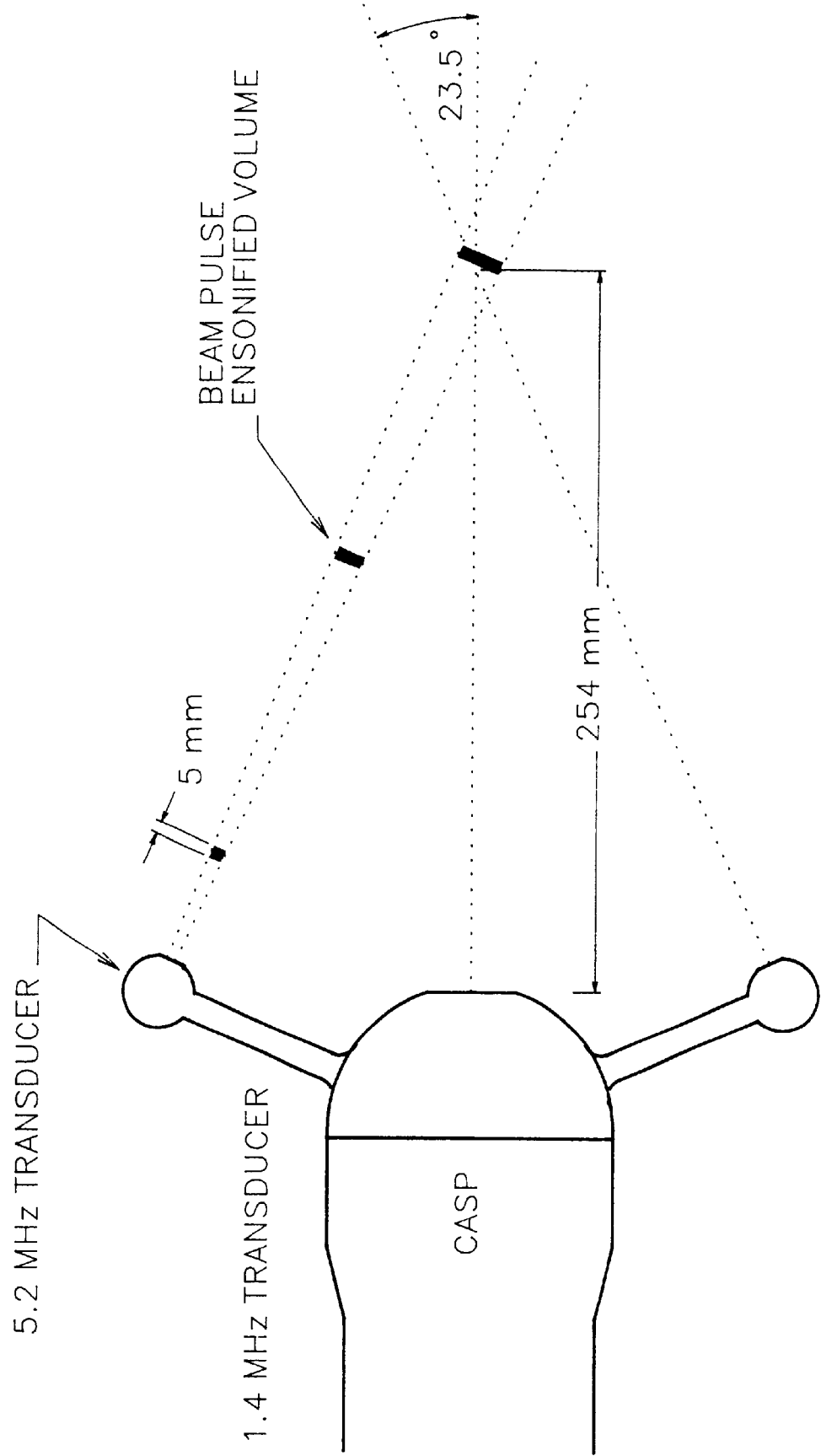
FIG. 2 is a schematic of the CASP bistatic mode operation. Multiple transmit pulses are shown with a single ensonified volume at the beam intersection point seen by the receiving transducers.

Three 5.2 MHZ transducers are embedded in the ends of 10 cm long arms mounted radially out from the instrument head (see the schematics in FIGS. 1 and 2), such that the narrow, 2.5° width beams intersect at a point 25 cm in front of the head. Bistatic operation is used to measure velocity components at this intersection volume. One of the three 5.2 MHZ transducers emits a series of 32, short (0.7 cm length in water), acoustic pulses into the water column, while the other two transducers "listen" to acoustic energy backscattered from particulates at the beam intersection volume. The schematic in FIG. 2 illustrates this bistatic mode of operation, in which several pulses, separated by 6 cm range, are ensonifying the water column. The signals received by the very narrow beam-width transducers from scatterers within the intersection volume are amplified and down-shifted by a homodyning, complex output mixer, then sampled coherently only at the primary sample volume by using a precise delay timed from the start of the transmitted acoustic pulse. After 32 complex (in-phase and quadrature) amplitude samples have been coherently sampled from both receiving transducers, the doppler shift frequency of the complex amplitude timeseries is estimated using a technique similar to the pulse pair algorithm (for example Mahapatra, P. R. and D. S. Zrnic, 1983. "Practical Algorithms for mean velocity estimation in pulse doppler weather radars using a small number of samples." IEEE Transactions on Geo-Science and Remote Sensing, GE-21, 4, pp 491–501). The transducers are then electronically switched such that another transducer is transmitting while the remaining two transducers receive. This round-robin sequence is rapidly repeated such that each of the three transducers has been a transmitter, resulting in six sets of complex amplitude estimates from which the velocity components can be estimated at a 36 Hz rate.

Figure 3:
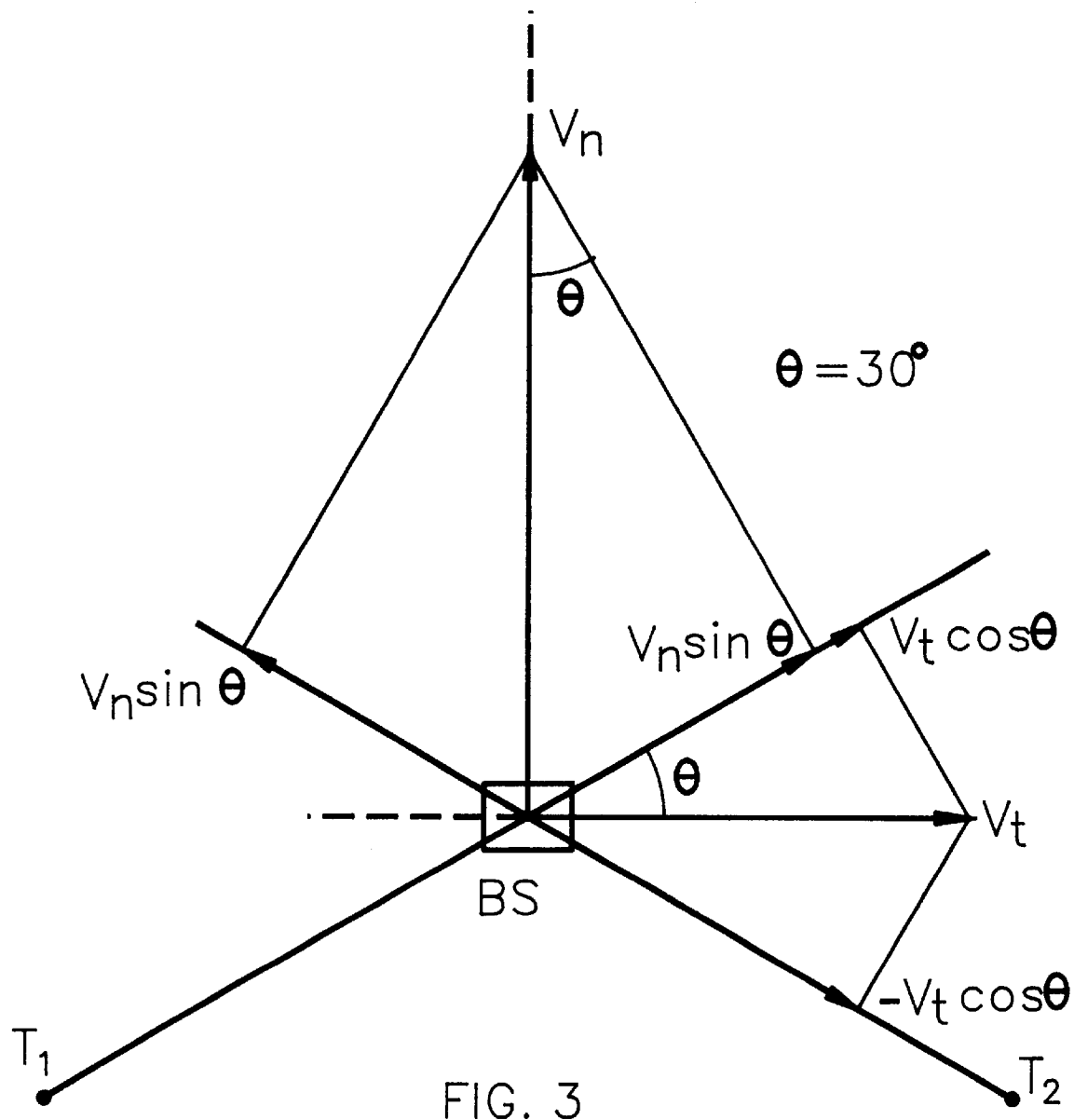
FIG. 3 is a diagram of the bistatic mode transducer beams geometry.

The bistatic doppler velocity estimation can be considered for any two of the three transducers, where transducer 1 is transmitting and transducer 2 is receiving. FIG. 3 shows the geometry for transducers T1 and T2, tilted in the plane formed by the acoustic beams. The very narrow (2.5° double-sided half power beam width) acoustic beams intersect at the primary scattering volume, labeled BS. An arbitrary velocity vector is shown as "True Velocity", with components $v_{BS}^{T1}$ directed along the T1 acoustic beam axis and $v_{BS}^{T2}$ along the T2 beam. Assuming that the transducers are in a fixed frame, the following doppler relationships can be derived. For a sound speed, c, a pulse transmitted at time t=0 will arrive at BS at time $t=t_1$, such that $$ct_1 = l + v_{BS}^{T1} t_1 \Longrightarrow t_1 = \frac{l}{c - v_{BS}^{T1}} \tag{1}$$

where 1 is the path-length T1 –BS, and c is the sound speed of the medium. Now, if a second pulse is transmitted at time $t_2$, it will arrive at BS at time $t_3$ and, eliminating 1

$$t_3 = \frac{l + ct_2}{c - v_{BS}^{T1}} \Longrightarrow t_3 - t_1 = \frac{c}{c - v_{BS}^{T1}} t \tag{2}$$

If, during interval (0, $t_2$) the transmitted frequency is $f_{tx}$, there will be $f_{tx} t_2$ wave fronts arriving at BS, during the interval $t_3-t_1$. Therefore, the frequency detected at BS will be:

$$f_{BS}(t_3 - t_1) = f_{tx} t_2 \Longrightarrow f_{BS} = \frac{c - v_{BS}^{T1}}{c} f_{tx} \tag{3}$$

The frequency $f_{BS}$ is the frequency of the scattered signal at BS that is sent towards T2. Using the same procedure, the frequency measured at T2 can be derived:

$$f_{t2} = \frac{c}{c + v_{BS}^{T2}} f_{BS} = \frac{c - v_{BS}^{T1}}{c + v_{BS}^{T2}} f_{tx} \tag{4}$$

If an arbitrary velocity vector at BS has a component $V_N$ in the direction bisecting the angle formed by the two acoustic beams, (see FIG. 3), then $$v_{BS}^{T1} = -v_{BS}^{T2} \tag{5}$$

and $$f_{T2} = f_{tx} \tag{6}$$

Therefore the only velocity component producing a doppler shift will be along the direction defined by the bisection of the two beams, i.e., $V_N$. This component will have equal projections along the two beams, so that:

$$v_{BS}^{T1} = v_{BS}^{T2} = V^{12} = V_N \sin\theta \qquad (7)$$

Therefore $$V^{12} = c\frac{f_{tx} - f_{T2}}{f_{1x} + f_{T2}} = c\frac{\Delta f^{12}}{2f_{tx} - \Delta f^{12}} \approx \frac{1}{2}c\frac{\Delta f_{12}}{f_{tx}} \qquad (8)$$

where the approximation is valid for low mach numbers ($V^{12} \ll c$), and so $$V_N = \frac{1}{2\sin\theta}c\frac{\Delta f^{12}}{f_{tx}} \qquad (9)$$

Because of the symmetric geometry of this system, this expression is also true for the case when T2 is transmitting and T1 receiving. This dual doppler frequency estimate provides increased confidence of the estimates by averaging, and allowing the detection of inconsistent doppler frequencies which can arise from decorrelating effects such as strong scatterers moving near the edges of the acoustic sample volume. By having all three transducers transmit in sequence, three different slanted $V_N$ velocity components are measured at the intersection volume.

The slanted bisector doppler velocity components are resolved into an orthogonal frame in the instrument co-ordinate system, and rotated into an earth-referenced level system by applying tilt sensor angles. In the CASP, the resulting 36 Hz V(u, v, w)(t) vector is resolved to a coordinate frame such that the +v component is directed in the direction of the T1 transducer arm.

2. Sediment Mass Estimation

Profiles of backscattered acoustic energy levels are measured for each of the 4 acoustic beams by interleaving monostatic transmit cycles between the bistatic cycles discussed in section 1. In this mode the downshifted, in-phase and quadrature acoustic components at each frequency, are sampled at time intervals equal to the transmitted pulse length to measure profiles of acoustic intensity, $V^2(i)$ at each bin, i, $$V^2(i) = (I(i)^2 + Q(i)^2)^{0.5} \qquad (10)$$

where I and Q are the in-phase and quadrature voltages for a given sample. The CASP uses these dual frequency profiles of backscatter level out to 1.1 m range, averaged to 4 Hz, to estimate the sediment mass for a given size spectrum of sediment size over a range of 0.001 Kg m$^{-3}$ to 25 Kg m$^{-3}$. This wide dynamic range has been achieved by using the high sensitivity of the 5.2 MHZ transceivers for the low concentration measurements, and 1.4 MHZ backscatter measurements for the higher concentrations, as the higher frequency measurements saturate (due to strong scattering effects) at lower concentrations. Up to 0(5 Kg m$^{-3}$), where both frequencies are below strong scattering levels, a measure of the population mean particle size can be made. A piecewise integration of the along-beam attenuation using empirically derived attenuation coefficients allows the mass concentration to be accurately estimated to twenty-fold greater concentrations than methods which do not account for acoustic attenuation by the scatterer population.

As evaluation of the acoustic system sensitivity, scatterer response function, and sediment attenuation factor all contribute significant errors, it was decided to base the mass concentration calibration of the CASP on direct laboratory measurements of the response of the system to known concentrations of sediment sampled from the field site where the instrument is to be used. By using backscatter measurements at two well separated acoustic frequencies, departures from the sample mean diameter of the test sediment can be determined by this method at moderate sediment concentrations. The model adopted for this method is given below:

$$M(r) = V^2 \times C_M \times \frac{r^2}{r_0^2} \times e^{4\int_0^r (\alpha_w + \alpha_s(M))dr} \qquad (11)$$

where V is the measured voltage output from the range-gated monostatic sonar, (or digital counts representing voltage), $C_M$ is the first order calibration coefficient determined from laboratory calibrations, r is the range from the transducer face to one of 51 range bins, $r_0$ is the range at which the calibration $C_M$ was determined, and $\alpha_s$ (M) is directly estimated from laboratory measurements of signal attenuation in the sediment laden water fluid, and, following Clay, C. S. and H. Medwin, 1977, "Acoustical Oceanography", Wiley-Intersciences, p. 98, the clear sea water attenuation can be estimated as $$\alpha_w = 3.52 \times 10^{-8} f^2 + 2.34 \times 10^{-6} S \frac{f^x f}{(f^2 + f^{*2})} \qquad (12)$$

where f=the transmitted frequency in KHz

S=the salinity in parts per thousand f*=93.2 KHz, the molecular relaxation frequency of MgSO$_4$.

As the along-beam attenuation by sediments coefficient is proportional to the sediment mass concentration, a piecewise integration method, starting beyond the nearfieled range of the transducer, is used to evaluate the attenuation integral in Equation (1), assuming that concentration estimated in the previous bin provides a reasonable estimate of attenuation, $\alpha_s$, in the current bin. This evaluation of attenuation is critical to obtain meaningful concentration profiles at levels above 1 Kg m$^{-3}$ for the 5.2 MHZ sonars, and 4 Kg m$^{-3}$ for the 1.4 MHZ sonar, as acoustic scattering greatly attenuates acoustic energy reflected from sediments in more distant bins under high concentration conditions.

The most significant limitation in using empirical calibrations based on actual sediment samples is that during actual field measurements, the sediment size spectra may depart from the sample spectrum used in the calibration. However the backscatter response changes slowly for ka ~1, where k=2πf$_0$/c is the transmitted wavenumber, c is the speed of sound in water, and a is the median sediment size. Also, as two widely separated frequencies are used in the CASP, an estimate of the change in mean sediment radius may be made based on the ratio $M_{5.2}/M_{1.4}$, assuming, just as more elaborate acoustic models must, that the sediment population remains unimodel, lognormal, and with an unchanging lognormal width parameter. The basis for this size discriminator is that backscatter response at each frequency decreases as ka becomes <<1. Clearly, significant departures from these underlying assumptions in the acoustic models will give rise to errors, requiring in situ measurements of the sediment size spectra, so the primary function of the dual frequency mass estimation the CASP is to allow these conditions to be identified.

The advantage for the direct laboratory calibration using actual sediment samples is that it represents a complete, end-to-end calibration of the system, with no a priori assumptions about the sediment spectra, and it provides robust calibration coefficients not only for the Calmass coefficient, but also for the important $\alpha_s$ (M) scattering/attenuation term.

Figure 4:
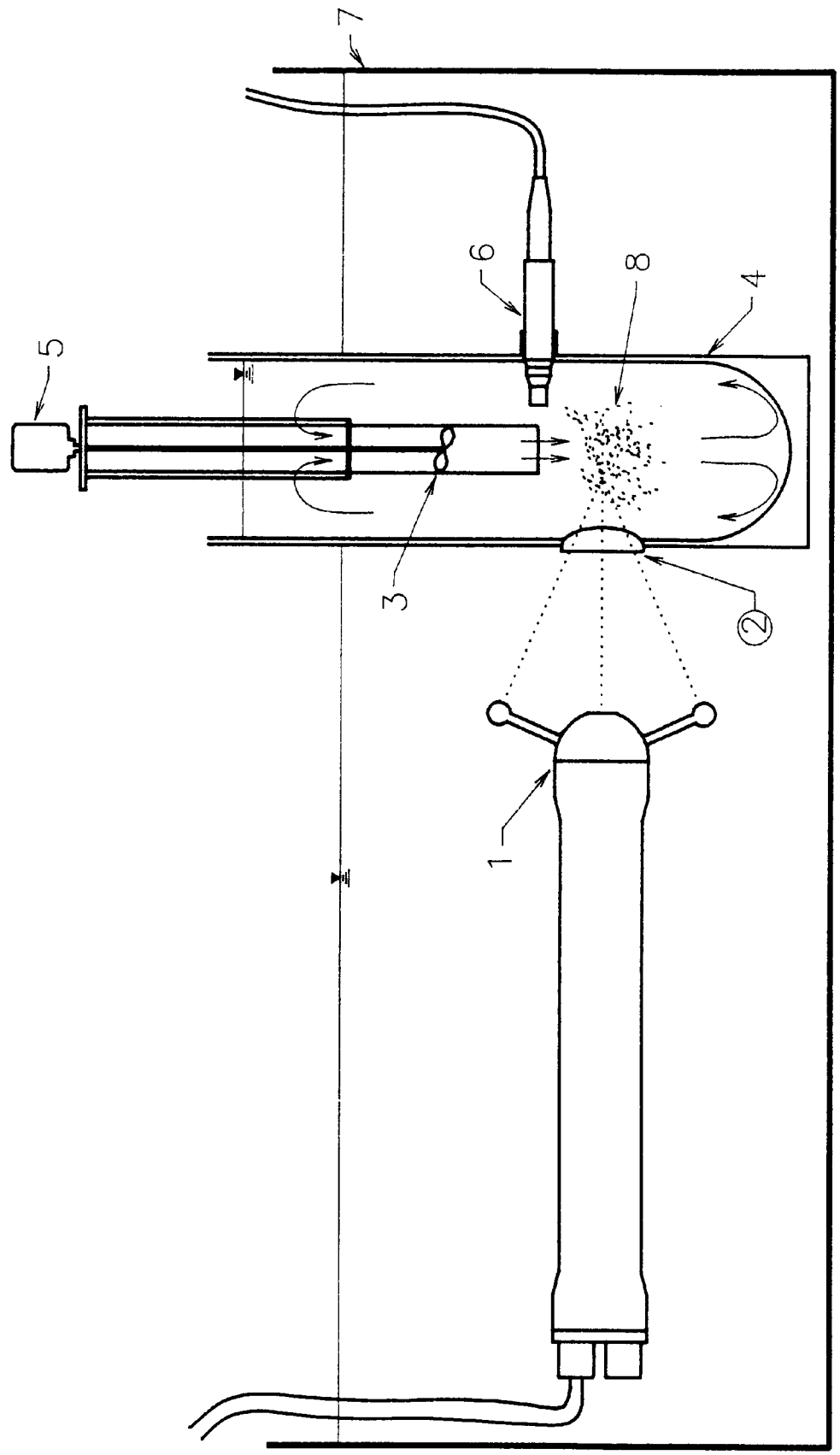

FIG. 4 shows a schematic of the calibration facility used to determine the transceiver sensitivity ($C_M$ in Equation (1)), and $\alpha_s$, (M). The calibration system consists of a 600 gallon acrylic aquarium equipped with a computer-controlled X/Y positioning stage, from which the CASP is suspended (see photograph in FIG. 5). Targets can easily be suspended in front of the probe while the instrument is moved in small increments in X/Y space to determine, for example, the angular sensitivity of the acoustic transducers and the precise intersection point of the beams. This usually laborious task is simply handled by the data acquisition computer which sends position commands to the intelligent servo controller, acquires and averages the specified acoustic data, then moves to the next position in the measurement loop.

An internal test vessel is used within the test tank to calibrate acoustic backscatter levels against known sediment concentrations. The sediment test vessel is shown in FIG. 4, and can be seen in the right hand side of the photograph in FIG. 5. The CASP or BDVSP acoustic beams are directed through an acoustically transparent window in the side of the acrylic test vessel which contains water and carefully measured masses of test sediment. A strong impeller-driven pump rapidly circulates the fluid and sediment within the measured volume of the vessel, creating a well homogenized volume with known concentration. The test vessel has been carefully designed to eliminate any level surfaces or flow stagnation points which might locally hold part of the sediment mass. Turbulence levels and recirculating flow speeds are maintained at sufficiently high levels to mix sediment particle sizes up to 2.2 mm at concentrations up to 50 Kg m$^{-3}$ without entraining bubbles into the volume. As the test volume and sediment mass are known, the relationship between backscatter level and concentration for all the beams can be readily determined by taking 0(100 s) averages of the received intensities. The effects of the clear-water attenuation and absorption by the acoustic window are taken into account in the calibrations.

3. Coherent Acoustic Sediment Probe (CASP) Implementation

The CASP system consists of a compact underwater housing equipped with three, radially placed 5.2 MHZ acoustic transceivers, a single central 1.4 MHZ transceiver, a pair of precision tilt sensors to measure package orientation tilts, and electronic processing and control modules which output a high speed digital data stream to a shore based processing computer. The instrument package is typically positioned looking downward at the bottom boundary layer to sample the velocity vector and sediment flux vector at a primary measurement volume 25 cm in front of the instrument head. In addition, profiles of sediment concentration are estimated every 1.68 cm along each of the 4 narrow acoustic beams.

As shown in FIG. 6, each of the 4 acoustic transducers is connected to a transceiver module which contains a high power pulsed transmitter, electronic transceiver switching, and a bandpassed gain stage. Packets of sinusoidal acoustic waves are generated by the transmitter circuits using control signals and clock frequencies generated by the acoustic's sequencer/controller board. Backscattered acoustic signals received by each transducer pass through a high gain, wide dynamic range, linear amplifier which drives in-phase and quadrature mixers. These mixers shift the received ultrasonic signals to base-band frequencies, which represent doppler shifts of the transmitted frequency due to the movement of the acoustic scatterers. The complex amplitude signals from each transducer are then sampled by fast sample and hold circuits at pre-programmed delays timed from the transmit pulse. This coherently sampled acoustic data stream is subsequently processed on a Digital Signal Processor in the shore-based computer to estimate the doppler velocity shifts by estimating the rate of phase change of the sampled complex amplitude using pulse-pair techniques similar to Mahaptra and Zrnic (supra.).

All timing and clock signals for the system are generated synchronously on the sequencer/controller/clock generation board, which connects the acoustic front end and main Analog/Digital (A/D) buses. This common clock design ensures that all the transmit frequencies, transmit control and sampling pulses are phase synchronous to meet the phase coherent sampling requirements and to minimize asynchronous digital noise sources interfering with the very sensitive acoustic front end amplifiers. An erasable programmable read only memory (EPROM) is used to store the complicated transmit and sample patterns for the transceiver modules required to achieve the hybrid monostatic and bistatic sampling sequence. This transmit control and sampling sequence is also synchronized with the programmable analogue multiplexer on the A/D sequencer board. A programming environment has been written on a workstation to flexibly generate the control sequences based on specified sampling strategies. The output code can be ported to an EPROM programmer, and the software also generates control files used by the analysis software to interpret the CASP data stream.

4 Bistatic Doppler Velocity and Sediment Profiler (BDVSP) Implementation

The newly invented BDVSP uses sampling methods, electronic systems and software processing similar to those of the CASP described above. The principals of operation and differences between the BDVSP and the CASP are described here. Referring to the schematic in FIG. 7, profiles of three component velocities are resolved from the range gated bistatic doppler shifts measured by each of the three bistatic receiver transducers (T1, T2, T3) from scatterers in the O(1 cm) length ensonified volume as it moves away from the transmitting transducer, T4. As described in the CASP bistatic operation above, the velocity component resolved by each receiver lies along the bisecting angle formed between lines joining the receiver transducer (e.g., T1) and each range bin, and each range bin and the transmit transducer, T4. Therefore this resolved angle is a function of distance of each range gate from the transmitter transducer, but is completely defined by the transducer geometry, receiver and transmitter beam patterns, and sound speed.

The primary disadvantages of the BDVSP compared to the CASP are:

1.) In the BDVSP, only a single frequency transceiver is used to infer sediment concentration. This slightly limits the lowest detectable sediment concentration (determined by the noise floor of the central monostatic transceiver). By using a single frequency, the ability to detect changes in sediment population, described in section 2 below, is lost. In applications where this is important, additional monostatic transceivers with different frequencies could be added to the instrument head with beams parallel and close to the 1.3 MHZ T4 acoustic beam.

2.) In the CASP, the narrow beam-width bistatic transducers directed to the primary sample volume allow several transmitted acoustic pulses to be in the water column at the same, providing a very high pulsed coherent sample rate of the doppler shift frequencies. This high sample frequency in turn allows a large unambiguous range of scatterer (and hence fluid) velocity to be measured. The doppler sampling frequency, $f_s$, may be expressed in terms of the range, R, between successive acoustic pulses as $$f_s = \frac{c}{2R} \tag{13}$$

so the maximum velocity along the resolved axis before the doppler frequency becomes aliased is $$v_{max} = \pm \frac{c^2}{8 f_{tx} R \sin\theta} \tag{14}$$

In the CASP, the short interpulse range and 5.2 MHZ transmit frequency results in a velocity range of $\pm 2.0$ ms$^{-1}$ for cross velocity components and $\pm 0.9$ ms$^{-1}$ for velocity components along the instrument axis. However in the BDVSP, as the receivers deliberately have wide acoustic beam patterns along the main acoustic axis to receive backscattered energy at many range bins as acoustic pulses propagate away from the central transmitter, only one transmit pulse can be "seen" in the water column at a time. Consequently the range between successive acoustic pulses is determined by the distance between the central transducer, T4, and the sediment bottom, (approximately 1 m for nearshore boundary layer studies to span the bottom boundary layer and avoid flow disturbance by the instrument case) and the bistatic receiver. This limits the non wrapped velocity range to $\pm 0.22$ ms$^{-1}$ along the bistatic acoustic axis, which is close to the vertical axis of the instrument. This range is significantly greater for the horizontal velocity components (for example $\pm 1.7$ ms$^{-1}$ at 1 m range) due to the shallow angle resolving cross-instrument currents into the bistatic axes, which is helpful for dominantly horizontal flows typical of bottom boundary layers. In the BDVSP this velocity alias range has been extended by a factor of 3 by using two different interpulse periods which effectively sample the actual doppler frequencies at two different frequencies (see for example Lhermitte, R. 1985. "Water velocity and turbulence measurements by pulse coherent doppler sonar". Proceedings of Oceans 85, Vol 2, pp1159–1164). The two sample frequencies are related by integer relationships, in this case $3f_{s1}=4f_{s2}$, so when aliased frequencies are sampled, the difference frequency between the two doppler estimates, $f_1 - f_2$, has a predictable relationship which allows the quadrants of the alias wraps to be determined and corrected. Under favorable signal to noise ratio conditions, this allows the resolved velocity range to be increased by a factor of three more than the values shown above, allowing the BDVSP to be used in moderately forced oceanic boundary layers.

These systems have been fully reduced to practice and successfully deployed in field research programs in the surf zone. The CASP was used for four weeks during the ONR sponsored Duck94 experiment at Duck, North Carolina, and the BDVSP deployed for eight weeks during the ONR Sandy Duck experiment.

It will be apparent to those skilled in the art that many alternatives and modifications in the present invention are possible in light of the above teaching. It is, therefore, to be understood that the present invention may practiced within the scope of the following claims other than as described herein.

What is claimed is:

1. A Bistatic Doppler Velocity and Sediment Profiler (BDVSP) device for measuring sediment concentration, sediment velocity, and the resultant sediment transport in a sediment bed, and for the measurement of turbulent stresses and dissipation in the ocean, which comprises:

a single, central, monostatic pulsed transducer to ensonify a small volume, controlled by the transmit pulse length and beam width; and three fan beam-response bistatic receiver transducers rigidly radially arranged around the central transducer to detect backscattered acoustic energy from the ensonified volume as it travels through the water column, whereby a profile of sediment mass is estimated from the acoustic backscatter level, measured at each range-gate of the central, monostatic, transducer; the along-beam velocity component is determined at each range-gate of the central, monostatic, transducer from the doppler shifts of the backscattered energy; the three component velocities are determined at each range-bin from doppler shifts measured by each of the bistatic receivers, and a knowledge of their beam response, the esonifying transmitter beam response, and the precise geometry of the four transducers; so that the profile of mass flux at each range bin is estimated from the product of the mass concentration, M(t,z), at each range bin with the three component velocity vector at the same range bin, $\vec{v}(t) \times M(t)$.

2. A method of using a Bistatic Doppler Velocity and Sediment Profiler (BDVSP) instrument to extend the capabilities of the Coherent Acoustic Sediment Probe (CASP) instrument by making continuous profiles of both three component velocity vectors and sediment concentration by using a single central pulsed coherent monostatic transceiver, with three radially placed bistatic receivers in a water column, wherein said velocity measuring steps comprising:

(a) transmitting a series of acoustic pulses from the center transducer such that there is at most one ensonifying pulse between the transducer and the sediment bed at one time;

(b) receiving acoustic energy scattered from scatterers in the water column at each of the three fan-beam response transducers positioned radially around the central transmitter transducer, and directed toward the central ensonifying beam;

(c) amplifying and downshifting the received signals by mixing the received signals with both an in-phase and quadrature reference signal equal in frequency and phase locked to the transmitted signal to form timeseries of In-phase and Quadrature signals;

(d) calculating the doppler frequency shift of the received signal by estimating the phase shift between successive complex amplitude vectors (I,Q)(t);

(e) resolving the calculated doppler velocity components from each of the three receiver transducers using the range-dependent bistatic angle, $\theta$, using equation 9, so there is a continuous profile of three component velocity vectors; and wherein the estimating the mass concentration to obtain M(t) by translating range-gated profiles of backscattered acoustic energy along the central transducer beam operated in the monostatic mode into sediment concentration profiles based on backscatter calibrations made with in situ samples of sediment comprising the steps of:

(a) transmitting a series of short duration acoustic pulses at a repetition rate determined by the maximum range to be measured (1 m for the BDVSP);

(b) downshifting the received signals with a very wide dynamic range complex demodulator;

(c) sampling the downshifted complex amplitudes at range gates equal to the transmitted pulse length;

(d) calculating the received energy at each range gate by estimating the mean backscatter level $V^2=\Sigma(I^2+Q^2)/n$, where n is the number of sample transmits in the monostatic ping sequence;

(e) in a laboratory tank, directing the central acoustic beam through a thin membrane into a controlled volume containing known masses of sediment sampled from the observation site;

(f) measuring the backscatter level, $V^2$ at a complete bin just inside the sediment sample volume;

(g) applying this laboratory calibration constant to convert the received intensity samples to mass concentration units;

(h) extending the accurate concentration dynamic range by applying a piecewise attenuation/scattering term to the backscatter profiles, to account for acoustic energy backscattered in range bins closer to the transducer than the current range bin, without which sediment concentration near the bed can be underestimated by factors >10 under in the presence of high suspended concentrations, further comprising the steps of:

(a) measuring the backscatter level $V^2(r)$ at successive range bins, r, within the sediment test volume described in 3.e above;

(b) determining the attenuation rate at each sediment mass concentration level, M, by fitting a linear fit to a regression of (r, $\log_e(V^2(r))$ to estimate $\alpha_s$ (M);

(c) applying a piece-wise integrated formulation of scattering and attenuation shown in (10) to filed—measured backscatter profiles using the laboratory derived $\alpha_s(M)$, with M estimated from mass concentration in the previous bin;

And wherein the profiles of turbulence-resolving velocity vectors are multiplied with the coincident sediment concentration profiles to form continuous profiles of three component sediment flux vectors above the sediment bed, further comprising the steps of:

(a) estimating three component velocity vector profile timeseries V(t,z);

(b) estimating the attenuation-corrected profile timeseries of mass concentration to estimate M(t,z); and (c) forming the product of the velocity vector profile timeseries and mass concentration profiles to obtain the vector profile timeseries of sediment flux:

$$\vec{F}(t,z) = \vec{v}(t,z) \times M(t,z).$$

* * * * *